(12) United States Patent
Hameed et al.

(10) Patent No.: US 11,577,170 B1
(45) Date of Patent: Feb. 14, 2023

(54) SYSTEMS AND METHODS FOR GAMIFICATION OF INSTRUMENT INSPECTION AND MAINTENANCE

(71) Applicant: BH2 INNOVATIONS INC., Newbury Park, CA (US)

(72) Inventors: Salmaan Hameed, San Jose, CA (US); Stephen J. Budill, San Francisco, CA (US); Michael S. Humason, Newbury Park, CA (US)

(73) Assignee: BH2 INNOVATIONS INC., Newbury Park, CA (US)

( * ) Notice: Subject to any disclaimer, the term of this patent is extended or adjusted under 35 U.S.C. 154(b) by 0 days.

(21) Appl. No.: 17/739,919

(22) Filed: May 9, 2022

(51) Int. Cl.
*A63F 13/533* (2014.01)
*G06T 13/00* (2011.01)
(Continued)

(52) U.S. Cl.
CPC ............ *A63F 13/533* (2014.09); *A63F 13/46* (2014.09); *A63F 13/5372* (2014.09);
(Continued)

(58) Field of Classification Search
CPC ........ G06F 3/011; G06F 3/017; G06F 3/0482; G06F 3/04815; G06F 3/04842; G06F 3/012; G06F 3/0346; G06F 3/014; G06F 16/444; G06T 19/006; G06T 19/20; G06T 2200/24; G06T 7/0004; G06T 19/00; G06T 19/003; G06T 17/00; G06T 2207/20081; G06T 2207/20084; G06T 2207/30164; G06T 2200/04; G06T 2219/024; G06T 2215/16;
(Continued)

(56) References Cited

U.S. PATENT DOCUMENTS

| 11,080,838 B1 * | 8/2021 | Li | G06V 20/17 |
| 2005/0038556 A1 * | 2/2005 | Gagnon | G16H 40/20 |
| | | | 700/226 |

(Continued)

OTHER PUBLICATIONS

Suikkanen, Samuel. "Gamification in Video Labeling." Aalto University, Aalto University, Jun. 17, 2019, https://aaltodoc.aalto.fi/handle/123456789/38931. (Year: 2019).*

*Primary Examiner* — Phi Hoang
*Assistant Examiner* — Scott E Sonners
(74) *Attorney, Agent, or Firm* — Ansari Katiraei LLP; Arman Katiraei; Sadiq Ansari

(57) ABSTRACT

Disclosed is a gamification system for overlaying user-controlled graphical targeting elements over a real-time video feed of an instrument being inspected, and providing interactive controls for firing virtual weapons or other graphical indicators to designate and/or record the presence of contaminants, defects, and/or other issues at specific locations within or on the instrument. The system may receive and present images of the instrument under inspection in a graphical user interface ("GUI"). The system may receive user input that tags a particular region of a particular image with an issue identifier, and may generate a visualization that is presented in conjunction with the particular image in the GUI in response to receiving the input. The (Continued)

visualization corresponds to firing of a virtual weapon and other gaming visuals associated with tagging the particular region of the particular image with the issue identifier.

19 Claims, 10 Drawing Sheets

(51) Int. Cl.
*G06F 3/0484* (2022.01)
*G06T 11/00* (2006.01)
*H04N 5/232* (2006.01)
*A63F 13/5372* (2014.01)
*A63F 13/46* (2014.01)
*G06T 7/00* (2017.01)

(52) U.S. Cl.
CPC .......... *G06F 3/0484* (2013.01); *G06T 7/0014* (2013.01); *G06T 11/00* (2013.01); *G06T 13/00* (2013.01); *H04N 5/23203* (2013.01); *H04N 5/23299* (2018.08); *A63F 2300/308* (2013.01); *A63F 2300/8076* (2013.01); *G06T 2200/24* (2013.01); *G06T 2207/20081* (2013.01); *G06T 2207/20092* (2013.01); *G06T 2207/30004* (2013.01)

(58) Field of Classification Search
CPC ....... G06T 2207/30108; G06T 2210/04; G06T 1/0007; G06T 13/40; G06T 7/00; G02B 2027/014; G02B 2027/0138; G02B 2027/0141; G06V 20/20; G06V 10/82; G06V 10/40; G06V 20/00; G06V 10/25; G06V 10/255; A63F 2300/8082; A63F 13/65

See application file for complete search history.

(56) References Cited

U.S. PATENT DOCUMENTS

| | | | |
|---|---|---|---|
| 2009/0197685 A1* | 8/2009 | Shuster | A63F 13/63 463/42 |
| 2020/0388177 A1* | 12/2020 | Recker | G06F 3/011 |
| 2021/0216773 A1* | 7/2021 | Bohannon | G06V 20/20 |

* cited by examiner

SYSTEMS AND METHODS FOR GAMIFICATION OF INSTRUMENT INSPECTION AND MAINTENANCE

BACKGROUND

Medical instruments must be free of contaminants, defects, and/or other issues before they may be safely used in a medical procedure. Any single issue may cause infection, harm, or even death if it is not caught and corrected prior to using the medical instrument in a medical procedure. However, medical instrument inspection may become a tedious task, and the technicians performing the inspections may lose focus when inspecting tens or hundreds of such instruments in a day. Consequently, a technician may overlook, miss, or improperly identify issues which may lead to improperly sanitized medical instruments or medical instruments with defects being used in medical procedures.

DETAILED DESCRIPTION OF PREFERRED EMBODIMENTS

Provided are systems and methods for the gamification of instrument inspection and maintenance. The gamification may introduce gaming elements, goals, and visuals to the inspection of medical instruments and/or devices performed by technicians. The gaming elements, goals, and visuals may increase and/or retain the technician's focus, engagement, attentiveness, and/or effectiveness during an inspection in order to improve the quality and accuracy of the inspection, and to ensure that the instruments are correctly distributed for continued use, issue remediation, or removal from service.

In some embodiments, the gamification may include overlaying user-controlled crosshairs or graphical targeting elements over a real-time video feed of the inspection, mapping the position of the graphical targeting element in each frame of video feed to an actual position of the medical instrument being inspecting, and providing interactive controls for firing virtual weapons or other graphical indicators to designate and/or record the presence of contaminants, defects, and/or other issues at specific locations within or on the medical instrument. Accordingly, the gamification may provide a graphical user interface ("GUI"), virtual reality ("VR"), augment reality ("AR"), or mixed reality interface that converts the tedious task of inspecting medical instruments with a scope and/or magnified video feed into an interactive game that better stimulates and engages the user with additional visual elements, interactivity, and/or gaming challenges (e.g., improving a high score).

In some embodiments, the gamification may incorporate artificial intelligence and/or machine intelligence ("AI/ML") techniques to score the performance and/or accuracy with which a technician identifies issues with a medical instrument. The AI/ML techniques may be trained to recognize visual characteristics of different contaminants, defects, and/or other issues on a variety of medical instruments, may analyze the real-time video feed of the inspection alongside the technician, may detect issues separate from the technician, and may score the performance of the technician by comparing the issues that are identified and/or tagged by the technician using the graphical targeting element against the issues automatically identified by the AI/ML techniques.

The gamification may incorporate the AI/ML techniques to provide real-time feedback as to the technician performance, and to create a game in which the technician competes against themselves (e.g., their past performance), the AI/ML, and/or other technicians to achieve the highest scores and/or greatest accuracy. Once again, the gamification better simulates and engages the technician by creating challenges or milestones that may be customized for the technician in order to keep the technician focused on the base task of inspecting medical instruments for issues.

Figure 1:
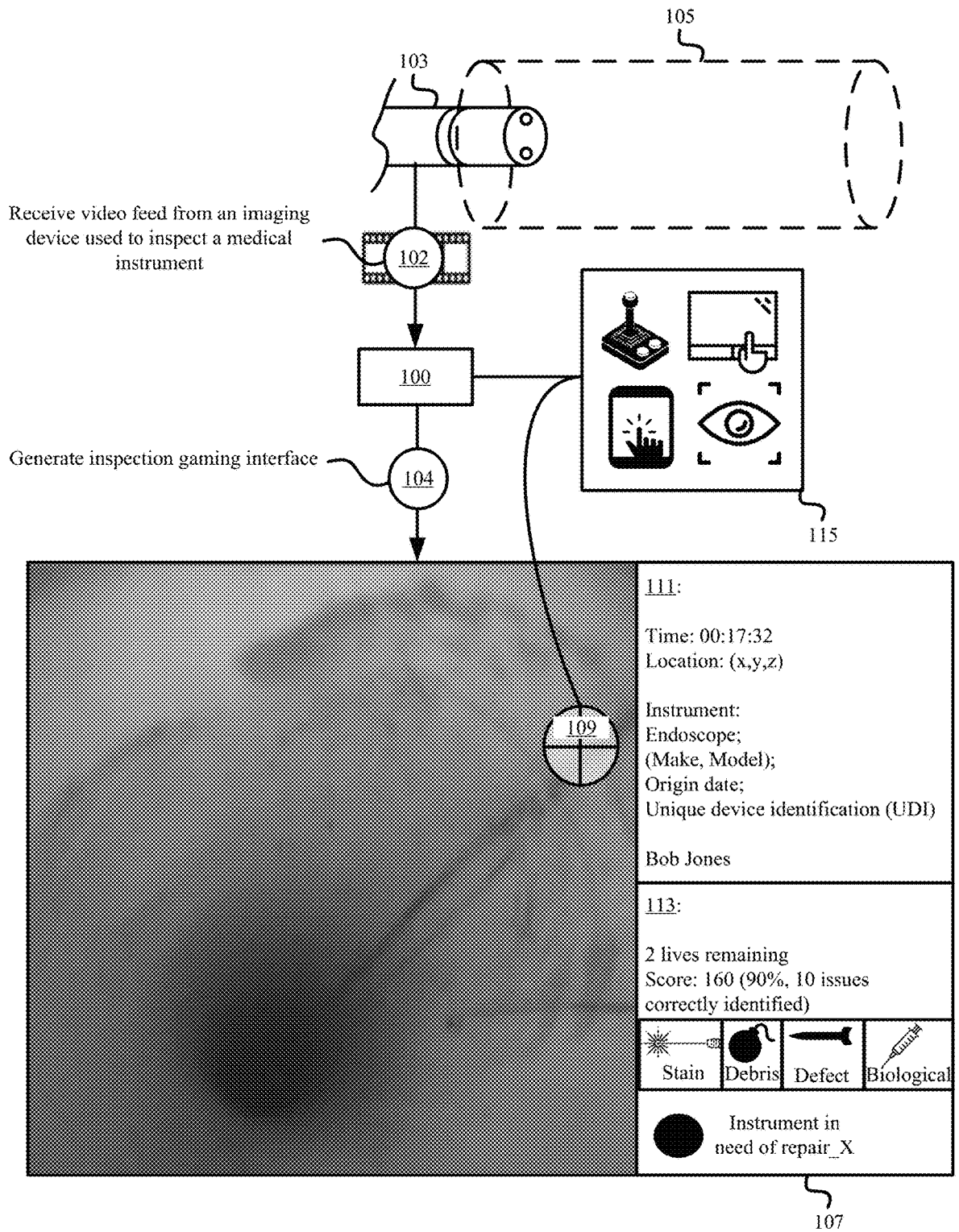
FIG. 1 illustrates a medical instrument inspection gamification example in accordance with some embodiments presented herein.

FIG. 1 illustrates a medical instrument inspection gamification example in accordance with some embodiments presented herein. Inspection gamification system ("IGS") 100 may receive (at 102) a video feed from imaging device 103 that is used to inspect medical instrument 105, and may generate (at 104) inspection gaming interface 107 on a display device used by a technician for the inspection of medical instrument 105.

Imaging device 103 may include a scope (e.g., a borescope) with an imaging sensor that may be passed through a lumen, channel, or inside various medical instruments, and that captures continuous images of the lumen, channel, or inside of the medical instruments. The imaging sensor may provide magnification to increase the visual detail of the imaged surfaces or structures of the medical instrument. For instance, magnification may be used when the inspection requires the detection of microscopic or small features such as biological contaminants (e.g., bacteria, viruses, fungi, etc.). The scope may be coupled with optical fibers that provide light or illumination. The scope may also be coupled to a motor or actuator that controls the extension or mechanical movement of the scope into the medical instrument. In some embodiments, imaging device 103 may include one or more cameras that capture images about the outside or surface of various medical instruments from different angles, sides, and/or orientations. In some such embodiments, imaging device 103 may include a conveyor belt or mechanical arm that rotates or moves the medical instrument past the one or more cameras in order to expose the different sides or surfaces of the medical instrument to the one or more cameras.

IGS 100 may receive (at 102) the video feed from imaging device 103 as well as other input that may include the position of imaging device 103 about medical instrument 105. For instance, IGS 100 may receive (at 102) input for the distance that imaging device 103 is extended from a starting position.

Creating (at 104) inspection gaming interface 107 may involve introducing gaming elements, goals, and visuals with the video feed. As shown in FIG. 1, inspection gaming interface 107 may present the video feed, crosshair 109 or other graphical targeting element, inspection status 111, and game status 113.

Crosshair 109 may include a controllable tool for selecting regions within different frames of the video feed, and for tagging those regions with one or more identifiers corresponding to different issues and/or severities associated with the issues. For instance, crosshair 109 may be used to mark region within crosshair 109 or a region demarcated by crosshair 109 as containing a scratch, crack, or other structural issue.

Inspection status 111 may include a timer that tracks the duration of an inspection, a position of imaging device 103 relative to medical instrument 105 being inspected, identifying information about medical instrument 105, identifying information of the technician performing the inspection, and/or other data related to the inspection, medical instrument 105, the technician, and/or imaging device 103. Inspection status 111 may be presented in a first section of inspection gaming interface 107.

Game status 113 may include the number of remaining "lives" for the inspection, the technician's score, the technician's accuracy in correctly identifying issues, the number and/or severity of detected issues, the weapons or graphical tools for differentiating between different issues and/or different severities, detected state of medical instrument 105, and/or other visual elements related to the gamification of the video feed and/or inspection. Game status 113 may be presented in a second section of inspection gaming interface 107.

IGS 100 may receive various inputs from input devices 115. Input devices 115 may include a joystick, mouse, trackpad, touchscreen, trackball, force switch, eye-tracking cameras, speech recognition microphones, and/or other input devices that are connected to, integrated with, or provided by IGS 100. The input from input devices 115 may be used to control crosshair 109, select and/or interacting with the various gaming elements, and tag issues detected within inspection gaming interface 107. Specifically, input devices 115 may provide interactive means with which the technician or other user may control and activate crosshair 109 or graphical targeting element in inspection gaming interface 107 in order to select issues at different locations in an image and to tag the issues with one or more identifiers. The identifiers may differentiate between different types of issues and/or different levels of severity associated with an identified issue. For instance, different identifiers may be used to differentiate between stains, rust, liquids, non-biological debris, biological contaminants, chemical contaminants, scratches, structural discontinuity or damage, compressions, other defects, instrument states, and/or other issues.

Figure 2:
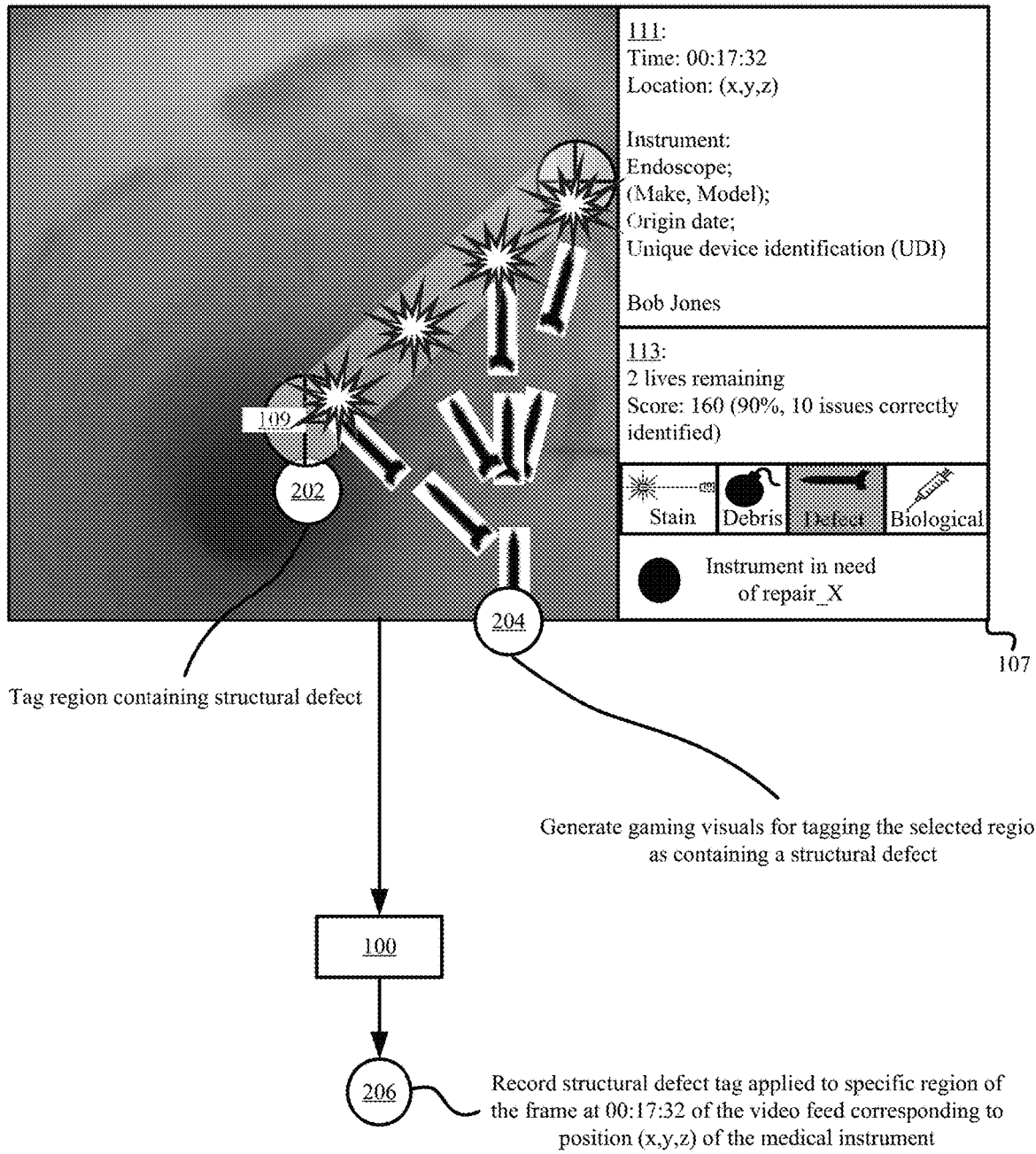
FIG. 2 illustrates a gamification example for tagging an issue in one or more frames of a video feed using the inspection gaming interface in accordance with some embodiments presented herein.

FIG. 2 illustrates a gamification example for tagging an issue in one or more frames of a video feed using inspection gaming interface 107 in accordance with some embodiments presented herein. As shown in FIG. 2, inspection gamine interface 107 presents a particular frame from the video feed produced by imaging device 103 used in examining medical instrument 105 for issues.

The technician may analyze the particular frame to determine that medical instrument 105 contains a scratch or structural defect at the position that is mapped to the particular frame. The technician may use input device 115 to tag (at 202) the region within the particular frame where the structural defect is located.

Tagging (at 202) the region may include moving crosshair 109 or the graphical targeting element to different positions in the particular frame where the structural defect is visible using input device 115, and invoking input with input device 115 to tag that region with a structural defect tag. In some embodiments, input device 115 may include different inputs or may accept different gestures for tagging a region with different issues. For instance, pressing a first button or performing a first gesture (e.g., single finger tap or slide) may be used to tag the selected region as containing a contaminant, and pressing a second button or performing a second gesture (e.g., two finger tap or slide) may be used to tag the selected region as containing a structural defect. In some embodiments, the technician may use input device 115 to select the graphical element or virtual weapon representing the desired issue before selecting the region within the particular frame where the issue is detected.

In response to the technician tagging (at 202) the region, inspection gaming interface 107 may generate (at 204) the VR, AR, and/or mixed reality gaming visuals for tagging the user-detected issue. Specifically, IGS 100 may show one or more missiles or other weapons firing on the selected position of crosshair 109 or the graphical targeting tool in order to tag the visual data under crosshair 109 or the graphical targeting tool with an identifier for the user-detected issue.

IGS 100 may record (at 206) and store the tagged frame so that the user-detected issues can be reviewed or provided to management or maintenance personnel. In addition to the issue that was tagged to the frame, IGS 100 may record (at 206) additional identifying information such as the position of the scope or imaging device 103 within medical instrument 105 where the issue was detected.

The maintenance personnel may refer to the video feed frames that were tagged with one or more issue identifiers in order to precisely locate where an issue identified by the technician exists relative to medical instrument 105 so that it may be reexamined, repaired, sterilized, and/or otherwise remediated. In other words, IGS 100 may map the tagged images back to a precise location about the medical instrument based on a tracked position of imaging device 103 relative to medical instrument 105 so that the identified issues may be quickly isolated without another full inspection of medical instrument 105, and so that there is tracked record of each and every issue that may be used to verify if all the issues are subsequently repaired or remediated.

Figure 3:
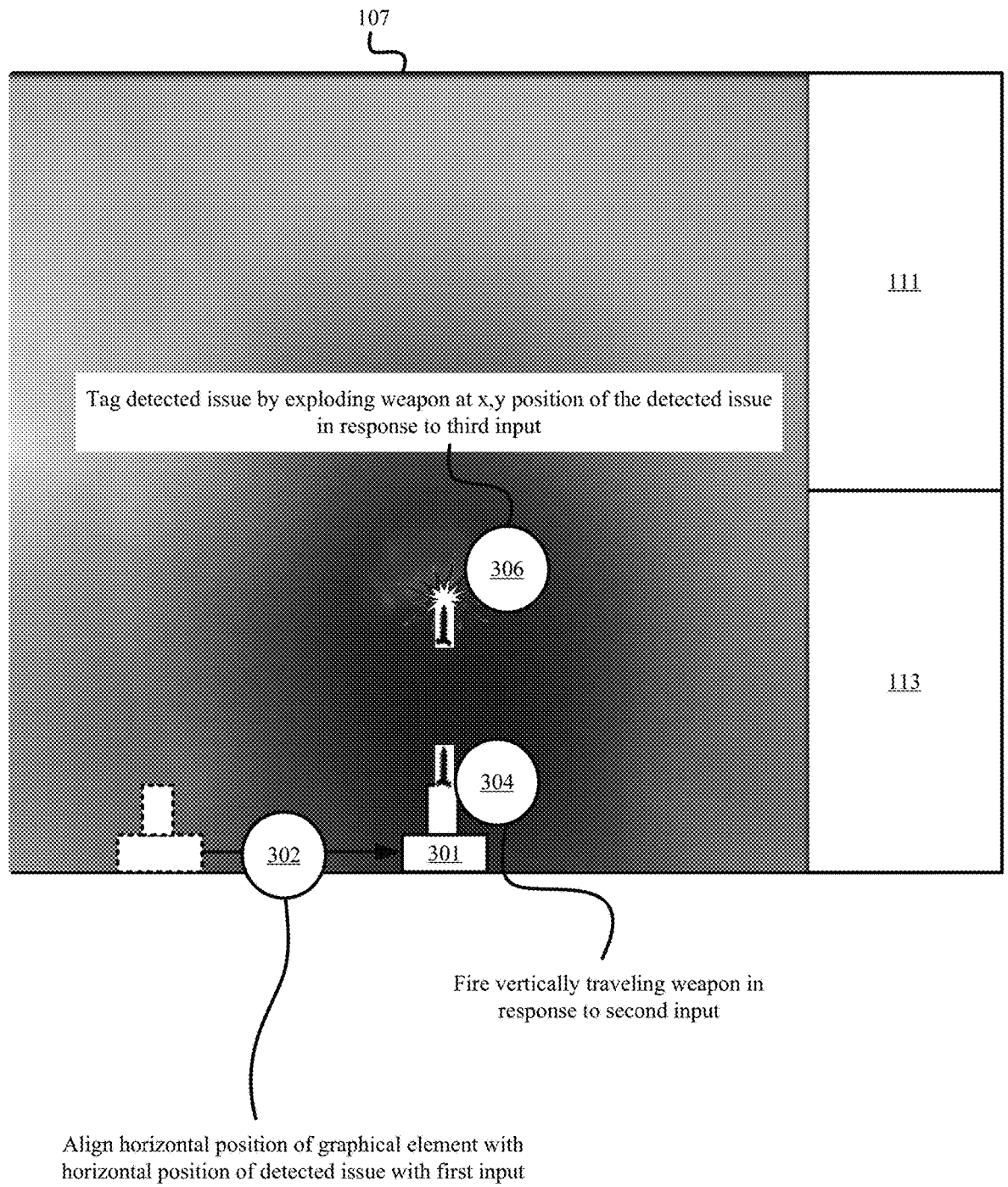
FIG. 3 illustrates an example of different gamification gameplay for tagging issues during inspection of a medical instrument in accordance with some embodiments presented herein.

IGS 100 may generate different gamification gameplay depending on the input device used or preferences of the user. FIG. 3 illustrates an example of different gamification gameplay for tagging issues during inspection of a medical instrument in accordance with some embodiments presented herein.

As shown in FIG. 3, free-moving crosshair 109 may be replaced with horizontally moving graphical element 301 at the bottom of inspection gamification interface 107. The user may align (at 302) the horizontal or x-plane position of graphical element 301 with the horizontal or x-plane position of a detected issue in the presented video feed based on first input provided using input devices 115.

The user may provide (at 304) second input to fire a weapon that travels vertically upwards towards the detected issue from the horizontal or x-plane position of graphical element 301. When the weapon becomes vertically aligned with the detected issue, the user may tag (at 306) the detected issue by providing third input (e.g., repeating the second input) to explode the weapon at the position of the detected issue. IGS 100 may record the x-coordinate and y-coordinate position of the detected issue in the presented frame based on x-coordinate and y-coordinate position at which the weapon exploded.

IGS 100 may then advance the video feed and/or the position of imaging device 103 in response to input by the user indicating that there are no additional issue to tag in this part of the video feed. In some embodiments, input devices 115 for controlling the gamification aspects of the inspection (e.g., moving and firing of the graphical targeting tool) may also be linked to and used to control the inspection itself (e.g., movement of imaging device 103 about the medical instrument under inspection). In some such embodiments, IGS 100 may be integrated as part of the inspection tool rather than a GUI that is overlaid and used to interact with what is presented by the inspection tool.

Figure 4:
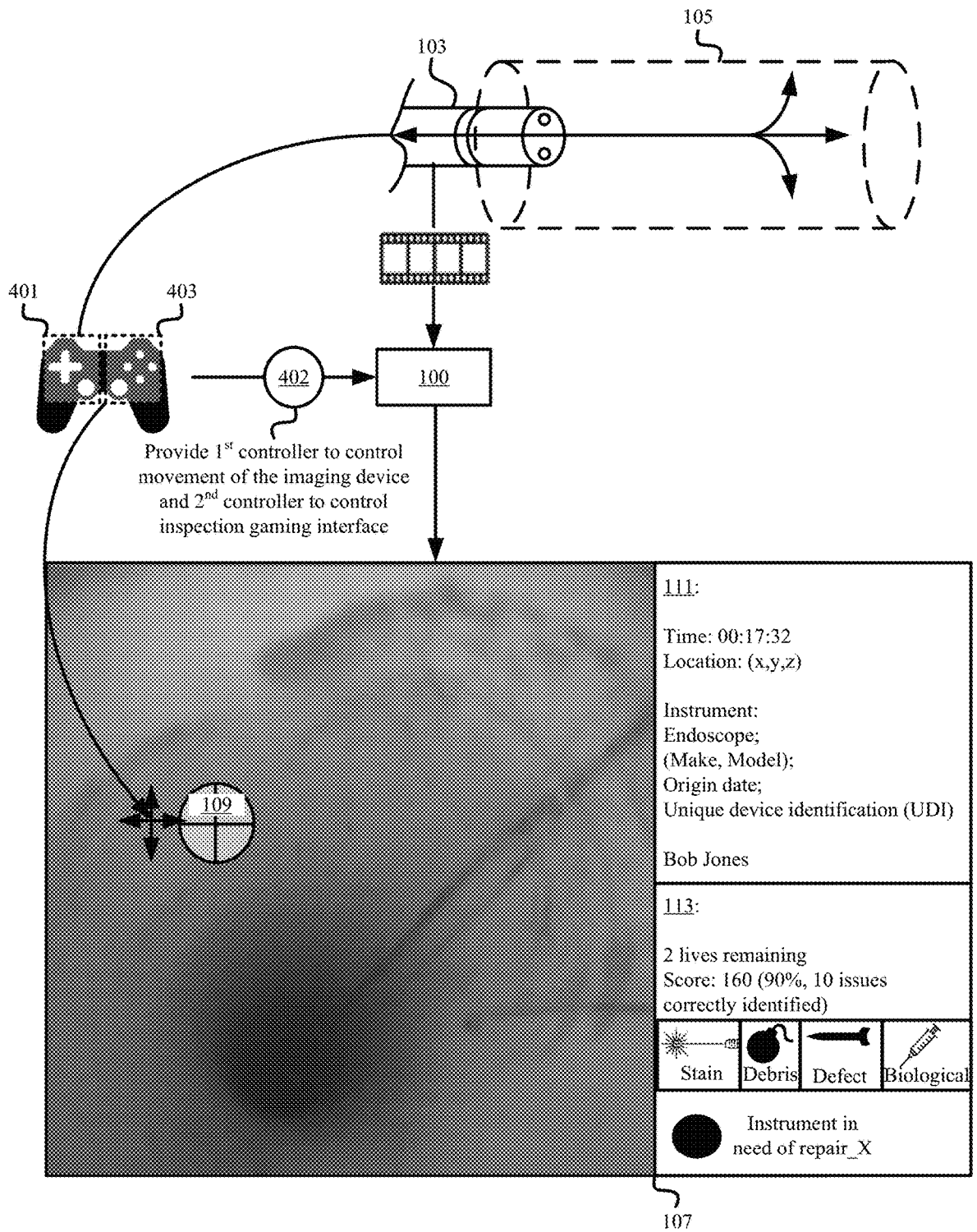
FIG. 4 illustrates an example of integrating the gamification controls as part of the medical instrument inspection in accordance with some embodiments presented herein.

FIG. 4 illustrates an example of integrating the gamification controls as part of the medical instrument inspection in accordance with some embodiments presented herein. IGS 100 may provide (at 402) or may be connected to first controller 401 for controlling movements of imaging device 103 relative to medical instrument 105 being inspected, and second controller 403 for controlling the graphical targeting element within inspection gaming interface 107.

For instance, imaging device 103 may be a borescope with an actuator that extends and/or moves the distal end of the borescope within a lumen, channel, chamber, or interior of the medical instrument. First controller 401 may be used to control forward and backward or upward and downward movement of image device 103. In some other embodiments, first controller 401 may be used to move imaging device 103 in three dimensions. Accordingly, first controller 401 may control the images that are presented in the real-time video feed and/or inspection gaming interface 107. First controller 401 also allows the user to go back and reexamine previously imaged parts of medical instrument 105, and/or to perform the inspection at their own rate or speed.

Second controller 403 may be linked and used to control graphical targeting element 109 that is generated by IGS 100 and overlaid onto the video feed obtained from imaging device 103 in inspection gaming interface 107. Second controller 403 may allow the user to select different regions within a presented image of the video feed via manipulations of a joystick, trackpad, touchscreen, voice commands, eye-tracking, and/or other input means, and to tag those regions with one or more identifiers via different button presses, gestures, commands, and/or other input means.

In some embodiments, second controller 403 may be used to define the size of the selected and/or tagged region. For instance, second controller 403 may be used to move graphical targeting tool 109 over to a particular location in an image, expand or contract a rectangle, circle, or other shape to the size and shape of a detected issue at the particular location in the image, and to tag the selected region with a particular identifier. IGS 100 may visually represent the tagging of the selected region by generating visuals or graphical elements in inspection gaming interface 107 for the firing of a weapon or other graphical element onto the selection region.

In some embodiments, second controller 403 may be used to differentiate between issues identified in the different regions or frames of the video feed. For instance, second controller 403 may include a first button or first input for tagging a first region with an identifier corresponding to a first issue (e.g., a chemical contaminant), and may include a second button or second input for tagging a second region with an identifier corresponding to a second issue (e.g., a structural defect). Similarly, second controller 403 may include a third button or third input for tagging a first region with a particular issue identifier and with a first severity (e.g., critical structural defect), and may include a fourth button or fourth input for tagging a second region with the same particular issue identifier but with a different second severity (e.g., permissible structural defect). IGS 100 may generate different gamification visuals for each of the differentiating tags. Accordingly, second controller 403 may be adapted to tag the issues with additional information, and/or to introduce additional gamification elements that increase the gaming interactivity and/or visuals in order to more fully engage users, provide additional gaming challenges or complexity, rate user accuracy in correctly identifying issues with additional granularity, and/or provide additional stimulation that furthers the targeting and firing gamification aspects.

Figure 5:
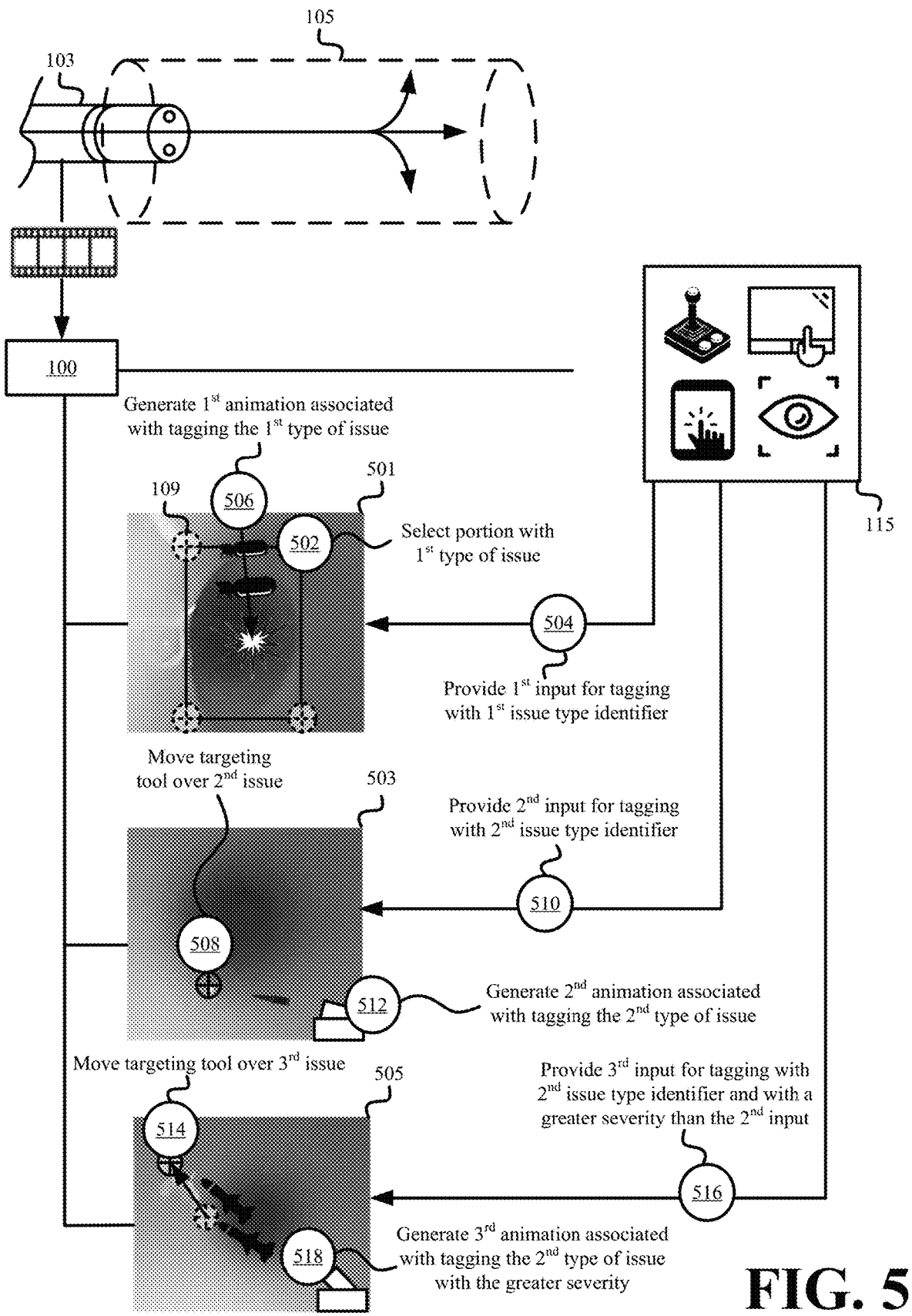
FIG. 5 illustrates an example of enhancing the gamification aspects associated with the medical instrument inspection to differentiate between user-identified issues in accordance with some embodiments presented herein.

FIG. 5 illustrates an example of enhancing the gamification aspects associated with the medical instrument inspection to differentiate between user-identified issues in accordance with some embodiments presented herein. FIG. 5 illustrates different frames or images 501, 503, and 505 from the video feed that imaging device 103 generates during inspection of a particular medical device.

The user may identify a first type of issue corresponding to the structural defect of crimping in first frame 501. The user may use input device 115 to move graphical targeting tool 109 over the portion of first frame 501 where the first type of issue is found, select (at 502) that portion of first frame 501, and provide (at 504) first input for tagging that portion of first frame 501 with an identifier corresponding to the first type of issue. In response to the first input, IGS 100 may generate (at 506) a first animated visualization that illustrates a first type of weapon associated with the first type of issue firing onto the selected region of first frame 501. Specifically, IGS 100 may generate (at 506) a first animation or visual that is associated with tagging the first type of issue.

The user may identify a different second type of issue corresponding to debris in second frame 503. The user may use input device 115 to move (at 508) graphical targeting tool 109 over the portion of second frame 503 where the second type of issue is found, and may provide (at 510) second input for tagging that portion of the second frame with an identifier corresponding to the second type of issue. In some embodiments, the user may switch between the first input and the second input by pressing different buttons, performing different gestures, invoking different commands (e.g., different speech commands), and/or otherwise invoking different functionality of input device 115. In some embodiments, the user may switch between the first input and the second input by selecting different icons for the different input in inspection gamification interface 107. In response to the second input, IGS 100 may generate (at 512) a different second animated visualization that illustrates a second type of weapon associated with the second type of issue firing onto graphical targeting tool 109.

The user may identify the second type of issue in third frame 505. However, the issue in third frame 505 may be more severe or impactful than the second type of issue identified in second frame 503. The user may use input device 115 to move (at 514) graphical targeting tool 109 over the portion of third frame 505 where the second type of issue is found, and may provide (at 516) third input for tagging that portion of third frame 505 with an identifier corresponding to the second type of issue and with a more severe or impactful classification. In some embodiments, the third input may be the same as the second input but may be used to specify a different severity by being pressed, held, or provided (at 516) for a longer duration than the second input. In some embodiments, the third input may be differentiated from the second input by invocation with greater force. For instance, input device 115 may include a force switch that can measure the amount of force applied for an input, and may be differentiate the severity of an identified issue based on the applied force. In response to the third input, IGS 100 may generate (at 518) a different third animated visualization that illustrates different firing of the second type of weapon or a third type of weapon that identifies the second type of issue with a greater severity. As shown in FIG. 5, the second visualization created for the second issue with the lower severity may include the firing of a bullet, whereas the third visualization created for the third issue with the greater severity may include the firing of missiles.

In some embodiments, the user-identified issues may span multiple frames of the video feed. In some such embodiments, the user may use input device 115 to move graphical targeting tool 109 over the portion of the first frame where the issue begins, and may press and hold the tagging input to follow and tag the issue across subsequent frames where the issue is found. IGS 100 may generate an animated visualization that is presented over multiple frames and follows movement of graphical targeting tool 109.

IGS 100 may use AI/ML techniques to incorporate a scoring component to the gamification of the medical instrument inspection. The scoring component may provide another gamification layer with real-time feedback for keeping the user engaged, focused, and stimulated on the inspection task, and for challenging the user to improve which, in turn, translates to higher quality inspections as a result of the user identifying more issues correctly.

IGS 100 may use the AI/ML techniques to analyze the video feed images alongside the user, and to automatically detect and/or classify various issues appearing in the video feed images based on a modeled set of visual characteristics for different issues that the AI/ML techniques are trained to recognize. IGS 100 may compare the user's finding and tagging of issues to those detected using the AI/ML techniques, and may generate scores that quantify the accuracy, performance, and effectiveness of the user in correctly detecting the issues based on the comparisons.

The scoring component may introduce mini-games, challenges, and goals that keep the user motivated, focused, and stimulated over the course of multiple inspections, and may be used to incentivize the user's performance via financial rewards, gifts, promotions, and/or benefits. For instance, with the scoring component, IGS 100 may track the effectiveness of a particular user over time, may compare the effectiveness of different users, and may compare the effectiveness of the particular user against the AI/ML-detected issues. Accordingly, a user may be challenged to beat their own high score, improve their accuracy, and/or compete against other users in order to win prizes and/or to receive other benefits.

The scoring component may also be used to provide customized technician or user training. For instance, the scoring component may track user performance in correctly identifying different issues, and may therefore identify deficiencies in the abilities of different users. IGS 100 may then provide customized training to the users in order to resolve their respective deficiencies. For instance, IGS 100 may use the AI/ML techniques and scoring component to determine that a particular user accurately identifies structural defects, but has a low accuracy with respect to identifying biological contaminants. Accordingly, IGS 100 may generate mini-games that present examples of inspections with multiple biological contaminants so that the particular user may be trained to better recognize those issues.

Figure 6:
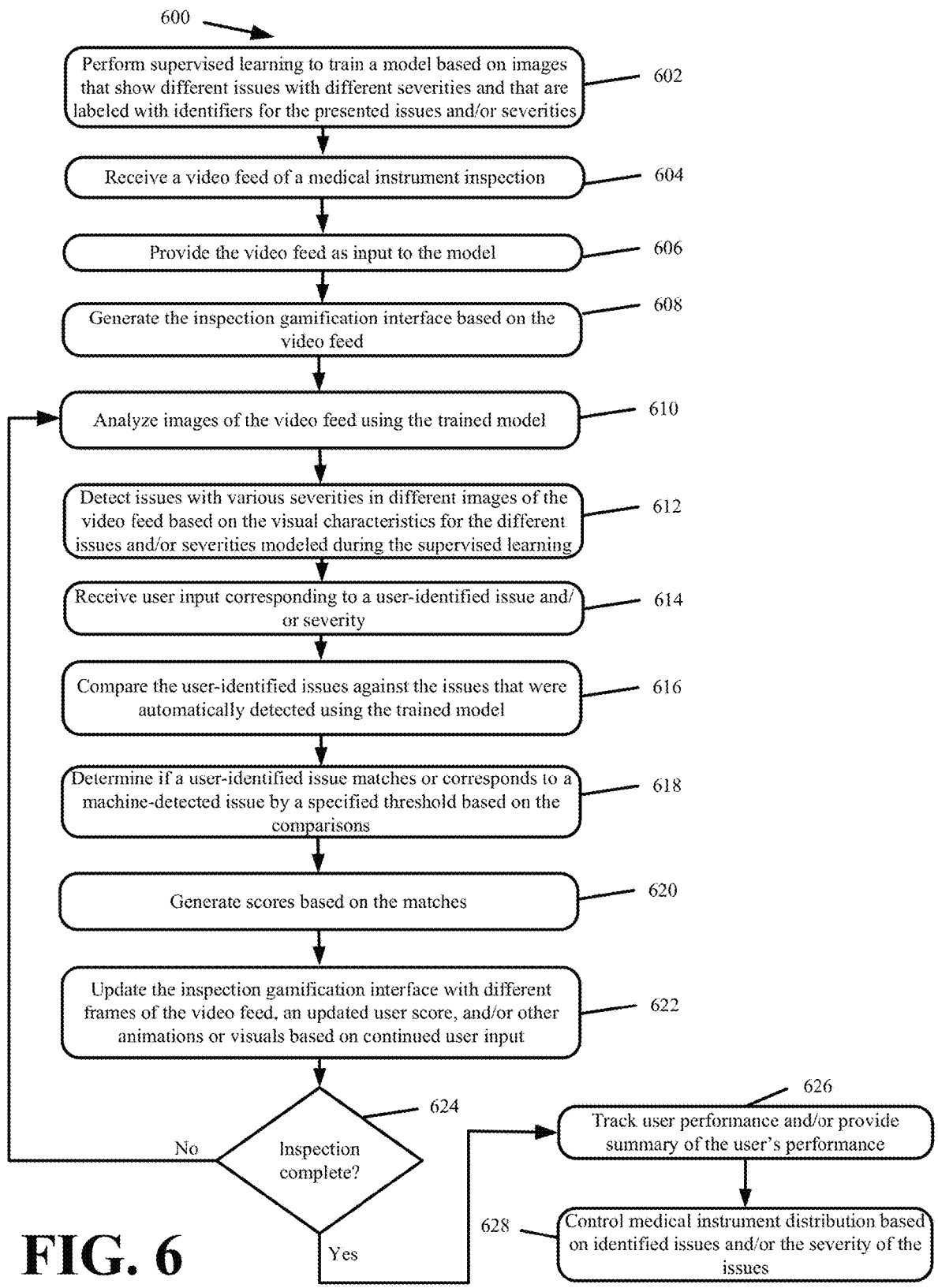
FIG. 6 presents a process for incorporating an artificial intelligence/machine learning ("AI/ML")-based scoring component to the gamification of the medical instrument inspection in accordance with some embodiments presented herein.

FIG. 6 presents a process 600 for incorporating an AWL-based scoring component to the gamification of the medical instrument inspection in accordance with some embodiments presented herein. Process 600 may be implemented by IGS 100.

Process 600 may include performing (at 602) a supervised learning using one or more AI/ML techniques to train a model based on images that show different issues with different severities and that are labeled with identifiers for the presented issues and/or severities. For instance, a convolutional neural network coupled with image classification or other supervised image classification neural networks may scan the labeled images to detect the common visual characteristics associated with each labeled issue and/or severity, and may generate a model that outputs a probability with which each set of visual characteristics identifies and/or differentiates one issue and/or an associated severity from other issues and/or other severities. In some embodiments, the AI/ML techniques may determine the visual characteristics that are most commonly associated with images of a particular issue with a particular severity and that are least commonly associated with images of other issues or other severities. In some such embodiments, the AI/ML techniques may compute a probability that the visual characteristics identify the particular issue with the particular severity based on the frequency with which those visual characteristics are found in the images with the particular issue and the particular severity, and are not found in other images for other issues or severities.

The visual characteristics that are found to commonly represent an issue with a particular severity may include sets of pixels from the different images where the issue has been isolated from other pixels representing the medical instrument, background elements, and/or other elements that are unrelated to the issue. Each set of pixels may represent a particular issue and/or a particular severity slightly differently. Accordingly, the modeling (at 602) may include performing a pattern recognition amongst the sets of pixels that represent the same issue with slight variations in order to define a shape, form, pattern, coloring, size, expressions, and/or characteristics that are satisfied and/or contained by each set of pixels for the same issue with the same severity.

Process 600 may include receiving (at 604) a video feed of a medical instrument inspection that is being conducted by a user using IGS 100. For instance, a borescope, camera, or other imaging device may be used to record video and/or generate images of the interior and/or exterior surfaces and structures of the medical instrument, and may output the video and/or images to IGS 100 via a wired or wireless connection or network.

Process 600 may include providing (at 606) the video feed as input to the model. In some embodiments, each frame of the video feed may be provided as separate input to the model.

Process 600 may include generating (at 608) the inspection gamification interface based on the video feed. The inspection gamification interface may include a VR, AR, or mixed reality visualization that presents the video feed along with the graphical targeting tool for tagging different issues and/or associated severities that the user spots at different regions in different frames of the video feed. The inspection gamification interface may also present additional information about the inspection, the medical instrument being inspected, the technician performing the inspection, and/or other pertinent information for the inspection in inspection status 111, game status 113, and/or other regions of the inspection gamification interface.

Process 600 may include analyzing (at 610) images of the video feed using the AI/ML generated models. Analyzing (at 610) the images may include performing image recognition and comparing the visual characteristics detected within the different images against the visual characteristics that were modeled for the various issues and/or severities during the supervised learning.

Process 600 may include automatically detecting (at 612) various issues with various severities in different images of the video feed based on the visual characteristics for the different issues and/or severities modeled using the AI/ML techniques. Automatically detecting (at 612) the various issues may include outputting an issue tag or classification label with or without a probability value from the AI/ML generated models for each frame of the video feed containing the visual characteristics associated with that issue tag or classification label. The probability value may quantify a certainty with which the AI/ML techniques recognize an issue (e.g., the certainty that detected visual characteristics in one or more images of the video feed uniquely identify a particular issue with a particular severity), and/or a certainty with which the visual characteristics in one or more images of the video feed match the visual characteristics that have been modeled for a particular issue with a particular severity during the supervised learning.

Process 600 may include receiving (at 614) user input corresponding to a user manually identifying issues with or without a severity ranking. The user input may be linked to corresponding frames of the video feed where the user-identified issue was tagged by the user.

Receiving (at 614) the user input may occur simultaneously with IGS 100 analyzing (at 610) the video feed images and automatically detecting (at 612) the various issues based on the AI/ML generated models. In some embodiments, receiving (at 614) the user input may include generating an animation or visuals within the inspection gamification interface to tag an issue that the user detects in a certain region of one or more frames. For instance, the user input may trigger the firing of virtual weapons at different regions of the video feed frames.

In some embodiments, the user input may include one or more regions within one or more images of the video feed that the user has manually tagged as containing an issue. In some embodiments, the tags may identify and/or classify the type of issue that the user has found. For instance, the user input may tag a region within an image as containing a biological contaminant, non-biological debris, different kinds of structural defects (e.g., cracks, compressions, indentation, hole, etc.), and/or other issues that IGS 100 has been trained to recognize via the supervised machine learning. In some embodiments, the tags may also or alternatively identify a severity of the identified issue. For instance, an issue may be classified as minor, moderate, critical, repairable, irreparable, hazardous, safe, and/or other classifications that rank the impact that the identified issue may have on the safety of the instrument, users that use the instrument, and/or patients that the instrument is used to treat.

Process 600 may include comparing (at 616) the user-identified issues against the issues that were automatically detected using the trained model and/or AWL techniques. The comparison (at 616) may include determining whether the issues and/or severities tagged by the user match to those automatically detected by IGS 100.

The comparison (at 616) may be made with a time, frame, and/or positional allowance. For instance, an issue identified in a first frame of the video feed by the AI/ML need not be matched against issues identified by the user in that same first frame. The user may need time to see the issue, process the image that is seen, and then activate the controller to register and/or tag the issue that was seen. Accordingly, the time and/or frame allowance may cause IGS 100 to compare user-identified issues against AI/ML-identified issues over a certain period of time (e.g., three seconds), certain number of frames (e.g., 180 frames) preceding or following the AWL-identified issue, and/or relative to closest user inputs. The positional allowance may cause IGS 100 to compare a user-identified issue in one region against an AWL-detected issue is an offset or nearby region. The positional allowance may be used to correct for the imprecision in the controller that the user may use to identify where an issue is detected and/or to allow the user to spot issues without having to specifically demarcate where that issue is in an image. Accordingly, a user-identified issue may be matched to an AI/ML-detected issue when a threshold percentage of pixels or visual characteristics from the user-identified issue match or within range of the pixels or visual characteristics from the AI/ML-detected issue.

Process 600 may include determining (at 618) if a user-identified issue matches or corresponds to an AI/ML-detected issue by a specified threshold based on the comparisons. A match may be made when the user-identified issue is found within the time, frame, and/or positional allowance of an AI/ML-detected issue, when the user-identified issue is the same issue as the AWL-detected issue, when pixels or visual characteristics tagged in one or more frames with a user-identified issue match by a threshold amount to pixels or visual characteristics tagged in the same or different frames with an AWL-detected issue or severity, and/or when the severity of the user-identified issue matches the AI/ML-detected issue.

Process 600 may include generating (at 620) scores based on the matches. For instance, IGS 100 may add a first score in response to the user-identified issue being the same issue with the same severity as an issue detected by IGS 100 (e.g., via the trained model and/or AI/ML techniques) in one or more related frames of the video feed, a second lower score in response to the user-identified issue being the same issue but with a different severity as an issue detected by IGS 100 in one or more related frames of the video feed, a third score, that is lower than the second score, in response to the user-identified issue being different than the issue detected by IGS 100 in one or more related frames of the video feed, and/or a fourth score or a penalty in response to the user-identified issue being a false positive for an issue that is not detected by IGS 100 or the user missing an issue that is identified by IGS 100 in one or more related frames of the video feed. In some embodiments, the scores may be adjusted based on the probability with which IGS 100 automatically detects an issue. For instance, if IGS 100 detects an issue with 90% certainty and the user does not identify that issue, then IGS 100 may penalize the user score by a first amount. However, if IGS 100 detects an issue with 40% certainty and the user does not identify that issue, then IGS 100 may not penalize the user score or may penalize the user score by a second amount that is less than the first amount.

In some embodiments, the scores may also be based on the speed with which the user performs the inspection. For instance, if a user completes inspection of a medical instrument in 10 minutes versus 20 minutes with the same accuracy, the scores for the 10 minute inspection will be greater than the scores for the 20 minute inspection. Accordingly, the scores may be adjusted based on the speed or distance that the imaging device or scope moves over a specific interval of time.

Process 600 may include updating (at 622) the inspection gamification interface with different frames of the video feed, an updated user score, and/or other animations or visuals based on continued user input. In some embodiments, the updated user score may be presented as a numerical value, as a set of indicators, and/or as various messages or notifications on the inspection gamification interface.

Process 600 may include determining (at 624) whether the inspection or video feed is complete. In response to determining (at 624—No) that the inspection or video feed is incomplete, process 600 may continue analyzing the video feed images, automatically detecting issues and/or severities in those images, comparing the automatically detected issues and/or severities with user-identified issues and/or severities, and updating the inspection gamification interface. In response to determining (at 624—Yes) that the inspection is complete, process 600 may include tracking (at 626) the performance of the user and/or providing a summary of the user's performance, and controlling (at 628) a distribution of the medical instrument that was subject to the inspection based on identified issues and/or the severity of the issues.

Tracking (at 626) the user performance may include notifying a manager when a user's issue spotting accuracy is below a threshold (e.g., less than 75% accurate), when the user performance hits certain milestones (e.g., 100% accuracy, 10 inspections completed in certain amount of time with baseline accuracy, etc.), or when instruments with certain issues are detected. Tracking (at 626) the user performance may also include customizing the training of the user based on their performance. For instance, IGS 100 may determine that a particular user has high accuracy (e.g., greater than 85%) with respect to identifying structural defects, and low accuracy (e.g., less than 70%) with respect to identifying biological contaminants. Accordingly, IGS 100 may generate a customized training session that provides the particular user with more examples of biological contaminants and less examples of other issues.

Controlling (at 628) the distribution of the medical instrument may include entering the medical instrument into available inventory, adding the medical instrument to an instrument set for an upcoming procedure, submitting the medical instrument to be sanitized, submitting the medical instrument for repair, maintenance, or other remediation, and/or removing the medical instrument from service based on the issues that were detected during the inspection and/or the severity of those issues. For instance, the medical instrument may be entered in the available inventory or added to the instrument set when no issues are detected or the detected issues are minor or harmless, may submit the medical instrument for sanitizing when harmful biological contaminants are detected, may submit the medical instrument for repair when defects with a severity that impacts safety and/or performance are detected, and may remove the medical instrument from service when the number of issues exceed a certain threshold or when the severity of the issues are beyond remediation.

In some embodiments, IGS 100 may provide visual instruction to control the distribution of the medical instrument. For instance, IGS 100 may update the inspection gamification interface to notify the user how to dispose of or distribute the medical instrument after the inspection is complete. In some embodiments, IGS 100 may control one or more actuators, robotic systems, conveyors, or the like to dispose of the medical instrument in a desired manner without human intervention.

Figure 7:
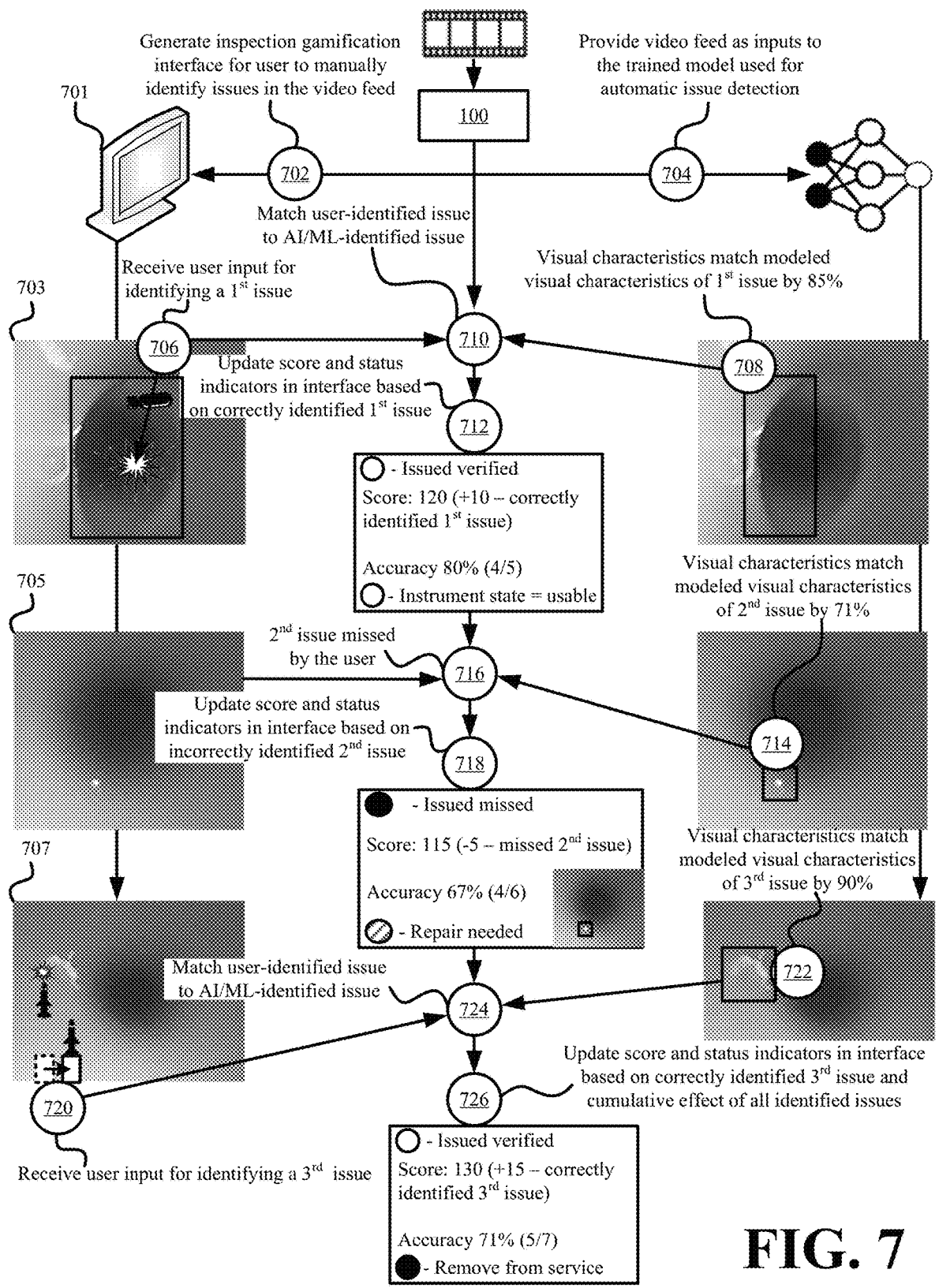
FIG. 7 illustrates an example of incorporating the AI/ML scoring within the inspection gamification interface in accordance with some embodiments presented herein.

FIG. 7 illustrates an example of incorporating the AI/ML scoring within the inspection gamification interface in accordance with some embodiments presented herein. As shown in FIG. 7, IGS 100 may receive a video feed of an inspection, may present (at 702) the video feed in inspection gamification interface on display device 701 for manual user identification of issues, and may provide (at 704) the video feed as input the AI/ML-generated model that is trained to detect various issues with different severities within the video feed images for the automated issue detection.

In response to presenting first frame 703 in the inspection gamification interface, IGS 100 may receive (at 706) input from the user that correctly identifies and classifies a first issue in that first frame 703. The first issue identified by the user may identify an issue that IGS 100 detects (at 708) with a certain probability in first frame 703.

IGS 100 may compare the user-identified issue to the AWL-identified issue, may determine (at 710) that the same issue was detected by the user and IGS 100, and may verify the user-identified issue as a correctly identified issue. IGS 100 may update (at 712) the inspection gamification interface to increase the user score, present a first indicator (e.g., a green light icon) that notifies the user of the correctly identified issue, and present a second indicator (e.g., another green light icon) that notifies the user of the instrument state and/or whether the inspection should continue. The user score may identify the total number of issues correctly identified by the user and/or a percentage for the user accuracy.

IGS 100 may not receive any input for any user-identified issues from the user in response to presenting second frame 705 in the inspection gamification interface. However, IGS 100 may detect (at 714) a second issue in second frame 705 with a threshold probability.

Since the second issue is identified by the trained model with the threshold probability, IGS 100 may determine (at 716) that the user missed or failed to identify the second issue. Accordingly, IGS 100 may update (at 718) the interface to decrease the user score (e.g., decrease the user accuracy) or the leave the user score unchanged, present the first indicator with a different color or value (e.g., a red color) that notifies the user of the missed issue, and present the second indicator with a different color that indicates that the instrument requires remediation and cannot be safely used again without remediation.

In response to the change in the first indicator, the user may move the inspection back to where the AI/ML-identified second issue was found, and IGS 100 may overlay a visualization over where the automatically detected issue is found with or without an identifier for the second issue. The user may analyze the region more closely to verify or override the automatically detected issue.

In response to presenting third frame 707 in the inspection gamification interface, IGS 100 may receive (at 720) input from the user that correctly identifies and classifies a third issue in that third frame 707. The third issue may be verified (at 724) based on that same issue with the same severity being output (at 722) by the trained model when input with the same or neighboring frames of the video feed. IGS 100 may update (at 726) the interface to increase the user score, present the first indicator (e.g., a green light icon) that notifies the user of the correctly identified issue, and present the second indicator with a third color or value that indicates that the instrument contains too many issues or the severity of the issues are too large that the instrument must be removed from service. In other words, IGS 100 may update (at 726) the interface based on the newly identified third issue, and also all issues that have thus far been detected during the inspection.

Accordingly, at the completion of the inspection, IGS 100 may update the interface based on the status of the second indicator, wherein the status of the second indicator is determined based on the number of detected issues and the severity of the issues. The updated interface may provide instruction on how the user is to dispose of the medical instrument. In this case, the medical instrument is determined to be irreparable, and should therefore be removed from service.

The scoring may become another gamification aspect for keeping the users engaged and/or focused. Specifically, the scoring allows each user to compete against themselves, others, and/or IGS 100 in order to improve their performance, wherein the improved performance may lead to financial rewards, awards, promotions, and/or other benefits for the user.

The performance tracking resulting from the inspection gamification may also be used to customize IGS 100 on an individual user basis. As noted above, IGS 100 may customize user training based on individual user performance and/or accuracy. IGS 100 may also customize the scoring and game difficulty based on a user's past performance.

Figure 8:
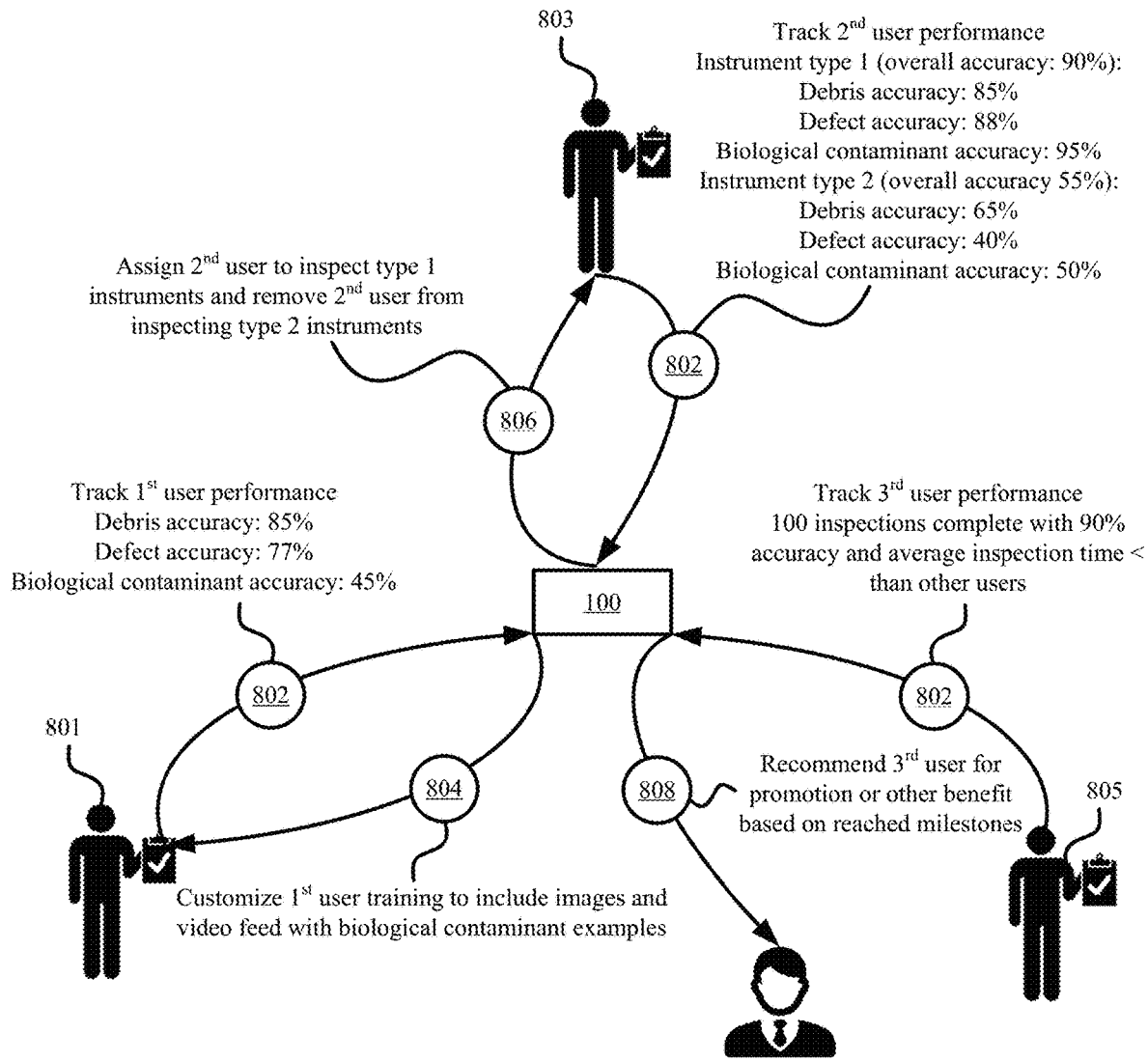
FIG. 8 illustrates an example of customizing system operation based on user performance in accordance with some embodiments.

FIG. 8 illustrates an example of customizing IGS 100 based on user performance in accordance with some embodiments. As shown in FIG. 8, IGS 100 may track (at 802) the performance of three different users 801, 803, and 805 performing different inspections over time.

IGS 100 may customize (at 804) training for first user 801 based on past performance of first user 801 indicating difficulty of the first user in correctly identifying biological contaminants in the lumen of a medical instrument. Accordingly, IGS 100 may filter the training data that was used to train the AI/ML models for automatically detecting different issues, and may retain the video feeds or images from the video feeds that were labeled to include examples of biological contaminants. IGS 100 may replay the video feeds with the biological contaminant examples to provide the first user with more practice in seeing and classifying biological contaminants.

IGS 100 may analyze the past performance of second user 803 to determine that second user 803 excels (e.g., has a very high accuracy) in identifying issues of a first type of medical instrument, and is poor (e.g., has a low accuracy) in identifying issues of a second type of medical instrument. IGS 100 may customize (at 806) its operation so that second user 805 is more frequently assigned to inspect medical instruments of the first type.

IGS 100 may analyze the past performance of third user 805 to determine that third user 805 has surpassed certain performance milestones. For instance, third user 805 may inspect certain types of medical instruments with a threshold level of accuracy and in less time than an average amount of time needed by other users to inspect those same medical instruments. In response to tracked performance of third user 805, IGS 100 may recommend (at 808) third user 805 for a promotion or other benefit, or may notify the third user's manager of third user's performance relative to other users.

Figure 9:
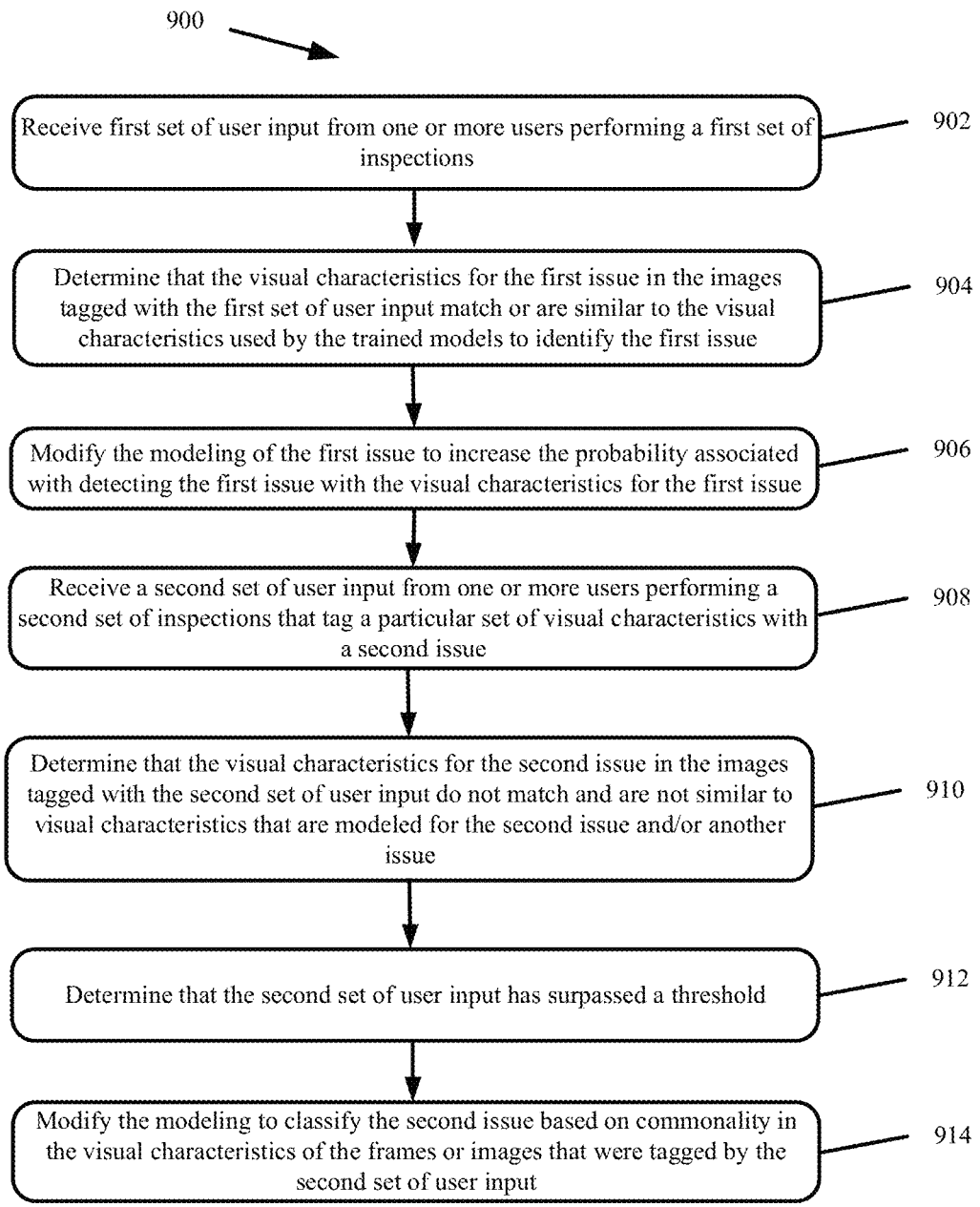
FIG. 9 presents a process for enhancing the gamification to become self-learning in accordance with some embodiment presented herein.

IGS 100 may use the user input to become a self-learning system that is able to detect new types of issues or variations of existing issues. FIG. 9 presents a process 900 for enhancing the gamification to become self-learning in accordance with some embodiment presented herein. Process 900 may be implemented by IGS 100.

Process 900 may include receiving (at 902) a first set of user input from one or more users performing a first set of inspections. The first set of user input may identify a first issue that is detected by the AI/ML-trained models with a low first probability (e.g., 40%).

Process 900 may include determining (at 904) that the visual characteristics for the first issue in the images tagged with the first set of user input match or are similar to the visual characteristics used by the AWL-trained models to identify the first issue. Accordingly, process 900 may include modifying (at 906) the modeling of the first issue to increase the probability associated with detecting the first issue with the visual characteristics for the first issue. Modifying (at 906) the modeling of the first issue may also include adding or changing the visual characteristics for the first issue in the model to more accurately match the visual characteristics in the tagged images.

Process 900 may include receiving (at 908) a second set of user input from one or more users performing a second set of inspections. The second set of user input may identify a second issue.

Process 900 may include determining (at 910) that the visual characteristics for the second issue in the images tagged with the second set of user input do not match and are not similar to visual characteristics that are modeled for the second issue and/or another issue. IGS 100 may consider the user-identified second issue as a false positive.

Process 900 may include determining (at 912) that the second set of user input has surpassed a threshold. For instance, IGS 100 may determine that the same issue has been repeatedly identified with the same visual characteristics in the second set of input such that the modeling should be changed to classify the second issue based on those visual characteristics. Accordingly, process 900 may include modifying (at 914) the modeling to classify the second issue based on commonality in the visual characteristics of the frames or images that were tagged by the second set of user input.

In this manner, IGS 100 may refine and improve its ability to classify different issues based on new and continual user input that is similar to or slightly different from the modeled visual characteristics for those same issues. In other words, IGS 100 may add, remove, or change the visual characteristics that are used to classify different issues as the user input tag the corresponding issues in images with the different visual characteristics. Similarly, IGS 100 may learn to classify new issues or identify new visual characteristics for certain issues once a threshold amount of user input is received identifying those new issues with a common set of visual characteristics.

Figure 10:
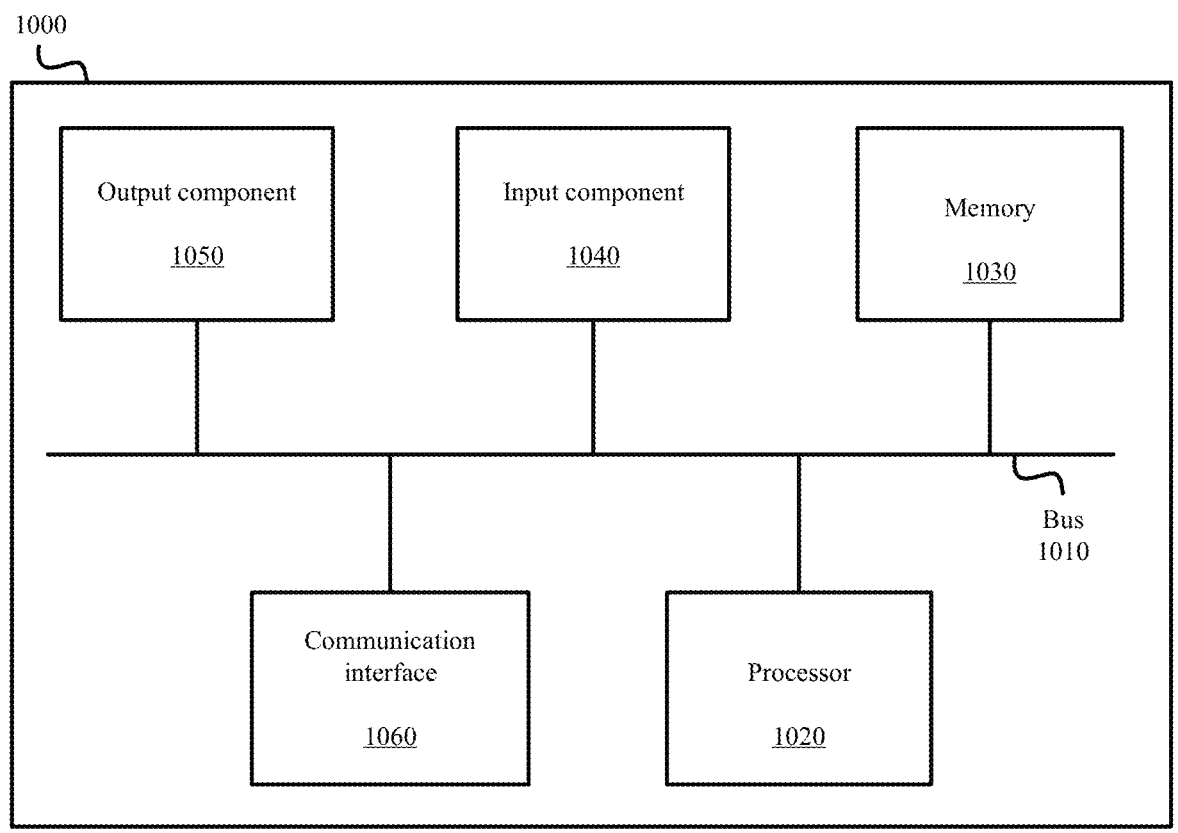
FIG. 10 illustrates example components of one or more devices, according to one or more embodiments described herein.

FIG. 10 is a diagram of example components of device 1000. Device 1000 may be used to implement one or more of the devices or systems described above (e.g., IGS 100, the inspection gamification interface, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    performing an inspection of a medical instrument by moving an imaging device in or about the medical instrument;
    receiving a video feed while performing the inspection, wherein the video feed comprises a plurality of images that capture different parts of the medical instrument with the imaging device at different positions in or about the medical instrument;
    mapping each image of the plurality of images to a particular position of the imaging device in or about the medical instrument;
    presenting the plurality of images in a graphical user interface ("GUI") as the imaging device is moved in or about the medical instrument;
    associating an issue identifier to a particular region of a particular image from the plurality of images in response to input that is issued via the GUI, wherein the issue identifier identifies a first issue from a plurality of different issues at the particular region based on the input being issued from a first input control of the GUI, and a second issue from the plurality of different issues at the particular region based on the input being issued from a second input control of the GUI;
    generating a visualization that is presented in conjunction with the particular image in the GUI in response to receiving the input, wherein the visualization comprises an animation for associating the issue identifier to the particular region of the particular image;
    recording a location of the first issue or the second issue in or about the medical instrument based on the associating of the issue identifier to the particular image and the mapping of the particular image to the particular position of the imaging device in or about the medical instrument;
    comparing the particular image to one or more machine-generated models of different issues affecting usage of the medical instrument in a medical procedure; and
    measuring a quality of the inspection based on (i) the particular image comprising characteristics defined within a particular machine-generated model of a particular issue, and (ii) the issue identifier associated with the particular region being an identifier for the particular issue.

2. The method of claim 1, wherein comparing the particular image comprises:
    analyzing visual characteristics from different regions of the particular image against a different set of visual characteristics associated with a different issue in each model of the one or more machine-generated models; and
    determining that the visual characteristics within the particular region of the particular image match to the characteristics defined within the particular machine-generated model of the particular issue by a threshold probability.

3. The method of claim 2 further comprising:
    increasing a score in response to the issue identifier corresponding to the particular issue.

4. The method of claim 1, wherein measuring the quality of the inspection comprises:
    verifying the particular issue in the particular image based on the issue identifier corresponding to an issue that matches the particular issue.

5. The method of claim 1, wherein generating the visualization comprises:
    generating a first visualization with a first set of visual elements in response to the issue identifier identifying the first issue; and
    generating a different second visualization with a second set of visual elements in response to the issue identifier identifying the second issue.

6. The method of claim 5,
    wherein generating the first visualization comprises presenting an animation of a first weapon firing onto the particular region; and
    wherein generating the different second visualization comprises presenting an animation of a different second weapon firing onto the particular region.

7. The method of claim 5, wherein the first issue and the second issue correspond to a different one of a biological contaminant, non-biological debris, and a structural defect.

8. The method of claim 1 further comprising:
    tracking a plurality of issue identifiers that have been associated to the plurality of images during the inspection of the medical instrument; and
    controlling a distribution of the medical instrument from a first physical location to a plurality of other physical locations based on the plurality of issue identifiers.

9. The method of claim 8, wherein controlling the distribution comprises:
    distributing the medical instrument for maintenance in response to the plurality of issue identifiers identifying one or more repairable issues;
    distributing the medical instrument for sterilization in response to the plurality of issue identifiers identifying one or more contaminants; and
    distributing the medical instrument for use in the medical procedure in response to the plurality of issue identifiers identifying issues that do not impact safety of the medical instrument.

10. The method of claim 8, wherein controlling the distribution comprises:
    presenting the GUI with a status of the medical instrument and an instruction for distributing the medical instrument to one of a plurality of destinations.

11. The method of claim 1 further comprising:
    overlaying a graphical targeting element over the plurality of images in the GUI; and
    wherein generating the visualization comprises:
        moving the graphical targeting element to the particular region of the particular image in response to first user input; and
        generating one or more visual elements illustrating a firing of a weapon onto the particular region in response to second user input.

12. The method of claim 1 further comprising:
    storing the issue identifier with the particular image; and
    tracking an issue with the medical instrument in response to associating the issue identifier to the particular region.

13. The method of claim 1, wherein the input is first input, the method further comprising:
  receiving second input;
  controlling movement of the imaging device in or about the medical instrument in response to the second input; and
  changing between the plurality of images in the GUI in response to controlling the movement of the imaging device.

14. The method of claim 1 further comprising:
  receiving a sample set of images that are labeled with a common issue identifier;
  training a second machine-generated model to output the common issue identifier based on a common set of visual characteristics in the sample set of images; and
  detecting the common issue identifier in a second image of the plurality of images without any input from a user based on visual characteristics of the second image matching the common set of visual characteristics from the second machine-generated model, wherein the second image is different than the particular image.

15. The method of claim 14 further comprising:
  determining that the user failed to identify an issue associated with the common issue identifier in response to the user not tagging any of the plurality of images with the common issue identifier and the issue identifier associated with the particular region of the particular image being different than the common issue identifier; and
  decreasing a score of the user in response to determining that the user failed to identify the issue.

16. The method of claim 14 further comprising:
  verifying that the user correctly identifies an issue associated with the common issue identifier in response to the issue identifier associated with the particular region of the particular image matching the common issue identifier and the particular image being less than a time threshold removed from the second image.

17. The method of claim 1 further comprising:
  associating one of a plurality of different severities with the issue identifier based on the input.

18. A system comprising:
  an imaging device;
  one or more processors configured to:
    perform an inspection of a medical instrument by moving the imaging device in or about the medical instrument;
    receive a video feed while performing the inspection, wherein the video feed comprises a plurality of images that capture different parts of the medical instrument with the imaging device at different positions in or about the medical instrument;
    present the plurality of images in a graphical user interface ("GUI") as the imaging device is moved in or about the medical instrument;
    associate an issue identifier to a particular region of a particular image from the plurality of images in response to input that is issued via the GUI, wherein the issue identifier identifies a first issue from a plurality of different issues at the particular region based on the input being issued from a first input control of the GUI, and a second issue from the plurality of different issues at the particular region based on the input being issued from a second input control of the GUI;
    generate a visualization that is presented in conjunction with the particular image in the GUI in response to receiving the input, wherein the visualization comprises an animation for associating the issue identifier to the particular region of the particular image;
    record a location of the first issue or the second issue in or about the medical instrument based on the associating of the issue identifier to the particular image and the mapping of the particular image to the particular position of the imaging device in or about the medical instrument;
    compare the particular image to one or more machine-generated models of different issues affecting usage of the medical instrument in a medical procedure; and
    measure a quality of the inspection based on (i) the particular image comprising characteristics defined within a particular machine-generated model of a particular issue, and (ii) the issue identifier associated with the particular region being an identifier for the particular issue.

19. A non-transitory computer-readable medium, storing a plurality of processor-executable instructions to:
  perform an inspection of a medical instrument by moving an imaging device in or about the medical instrument;
  receive a video feed while performing the inspection, wherein the video feed comprises a plurality of images that capture different parts of the medical instrument with the imaging device at different positions in or about the medical instrument;
  present the plurality of images in a graphical user interface ("GUI") as the imaging device is moved in or about the medical instrument;
  associate an issue identifier to a particular region of a particular image from the plurality of images in response to input that is issued via the GUI, wherein the issue identifier identifies a first issue from a plurality of different issues at the particular region based on the input being issued from a first input control of the GUI, and a second issue from the plurality of different issues at the particular region based on the input being issued from a second input control of the GUI;
  generate a visualization that is presented in conjunction with the particular image in the GUI in response to receiving the input, wherein the visualization comprises an animation for associating the issue identifier to the particular region of the particular image;
  record a location of the first issue or the second issue in or about the medical instrument based on the associating of the issue identifier to the particular image and the mapping of the particular image to the particular position of the imaging device in or about the medical instrument;
  compare the particular image to one or more machine-generated models of different issues affecting usage of the medical instrument in a medical procedure; and
  measure a quality of the inspection based on (i) the particular image comprising characteristics defined within a particular machine-generated model of a particular issue, and (ii) the issue identifier associated with the particular region being an identifier for the particular issue.

* * * * *